United States Patent
Chiou et al.

(10) Patent No.: US 6,792,507 B2
(45) Date of Patent: Sep. 14, 2004

(54) CACHING SYSTEM AND METHOD FOR A NETWORK STORAGE SYSTEM

(75) Inventors: Lih-Sheng Chiou, San Jose, CA (US); Mike Witkowski, Tomball, TX (US); Hawkins Yao, San Jose, CA (US); Cheh-Suei Yang, Los Altos, CA (US); Sompong Paul Olarig, Pleasanton, CA (US)

(73) Assignee: Maxxan Systems, Inc., San Jose, CA (US)

( * ) Notice: Subject to any disclaimer, the term of this patent is extended or adjusted under 35 U.S.C. 154(b) by 474 days.

(21) Appl. No.: 09/738,960

(22) Filed: Dec. 14, 2000

(65) Prior Publication Data

US 2002/0078299 A1 Jun. 20, 2002

(51) Int. Cl.[7] .............................................. G06F 12/08
(52) U.S. Cl. ........................ 711/119; 711/120; 711/129; 711/130; 711/141
(58) Field of Search ................................ 711/119, 120, 711/129, 130, 141

(56) References Cited

U.S. PATENT DOCUMENTS

| | | | |
|---|---|---|---|
| 4,755,930 A | 7/1988 | Wilson, Jr. et al. | 711/122 |
| 5,140,682 A | 8/1992 | Okura et al. | 711/130 |
| 5,247,649 A | 9/1993 | Bandoh | 711/130 |
| 5,530,832 A | 6/1996 | So et al. | 711/122 |
| 5,611,049 A | 3/1997 | Pitts | 707/8 |
| 5,699,548 A | 12/1997 | Choudhury | 711/143 |
| 5,778,429 A | 7/1998 | Sukegawa et al. | 711/129 |
| 5,835,756 A | 11/1998 | Caccavale | 707/1 |
| 5,835,943 A | 11/1998 | Yohe et al. | 711/118 |
| 5,845,280 A | 12/1998 | Treadwell, III et al. | 707/8 |
| 5,845,324 A | 12/1998 | White et al. | 711/128 |
| 5,852,717 A | 12/1998 | Bhide et al. | 709/203 |
| 5,864,854 A | 1/1999 | Boyle | 707/10 |
| 5,873,100 A | 2/1999 | Adams et al. | 707/204 |
| 5,878,218 A | 3/1999 | Maddalozzo, Jr. et al. | 709/213 |
| 5,881,229 A | 3/1999 | Singh et al. | 709/203 |
| 5,918,244 A | 6/1999 | Percival | 711/119 |
| 5,933,849 A | 8/1999 | Srbljic et al. | 711/118 |
| 5,944,780 A | 8/1999 | Chase et al. | 708/201 |
| 5,944,789 A | 8/1999 | Tzelnic et al. | 711/162 |
| 5,978,841 A | 11/1999 | Berger | 709/217 |
| 5,978,951 A | 11/1999 | Lawler et al. | 714/758 |
| 5,987,223 A | 11/1999 | Narukawa et al. | 358/1.9 |
| 5,991,810 A | 11/1999 | Shapiro et al. | 709/229 |
| 6,081,883 A | 6/2000 | Popelka et al. | 712/28 |
| 6,085,234 A | 7/2000 | Pitts et al. | 709/217 |
| 6,098,096 A | 8/2000 | Tsirigotis et al. | 709/213 |
| 6,138,209 A | 10/2000 | Krolak | 711/122 |

OTHER PUBLICATIONS

PCT/US01/47769 International Search Report dated Apr. 23, 2002.

Primary Examiner—Reginald G. Bragdon
(74) Attorney, Agent, or Firm—Gray Cary Ware & Freidenrich LLP

(57) ABSTRACT

A cache system and method in accordance with the invention includes a cache near the target devices and another cache at the requesting host side so that the data traffic across the computer network is reduced. A cache updating and invalidation method are described.

55 Claims, 10 Drawing Sheets

CACHING SYSTEM AND METHOD FOR A NETWORK STORAGE SYSTEM

BACKGROUND OF THE INVENTION

This invention relates generally to a system and method for storing data on computers connected by a network, such as the Internet and in particular to a caching system and method for reducing the data traffic and problems associated with network storage systems.

Typical enterprise applications that run on today's Internet environment generally need to draw large amounts of data from either local or remote corporate data centers through geographically dispersed networks (e.g. Local Area Networks, Wide Area Networks, etc.). In many cases, this data traffic must share the network bandwidth with all other traffic on the network, making the delivery of data very much susceptible to network congestion. Caching is a technique of mapping frequently used data from a slow storage device, in which it is typically stored, to a higher speed storage device to achieve data access performance gains since the data can be more rapidly accessed from the higher speed storage device. Extending this concept in a network environment for remote data sources, it is possible to map the remote data into a local cache which is near the requesting host device in order to decrease/eliminate the delay due to network traffic congestion.

The greatest challenge associated with using caches is ensuring data coherency, i.e. to make sure that the data in the cache are always the same as the data stored in the target storage device. For static data, there are no such concerns because the data in the target storage device stays the same so that the data in all caches extracted from the original data will always be the same as the original. However, in real-world situations, data usually gets updated frequently, making it necessary for the caches to either refresh themselves frequently to obtain the current data or to invalidate the data stored in the cache so that applications reading from the cache will not get "stale" (e.g., invalid) data from the cache.

Currently in the industry, there exist several cache mechanisms and architectures for improving the performance of data retrieval from remote storage devices. These include storage subsystems (e.g. RAID controllers) in a storage network environment, web caches in implemented within web browsers, and web cache appliances. Each of these cache mechanisms are designed to improve data retrieval performance for their specific applications.

In storage networks (e.g. Fibre Channel networks), any number of hosts read and write data to storage subsystems (e.g. RAID controllers) across the network. Storage subsystems attached to these storage networks implement cache memory either inside the storage devices (i.e. disk drives) or on the subsystem controller cards. In both cases, they usually have very limited amounts of cache storage space installed. Moreover, these kinds of caches may not help the overall performance much if the transmission latency between the storage subsystem and the requesting host is large, as usually is the case in large geographically dispersed networked environments.

On the other hand, the web page caching mechanism implemented in the web browsers on individual client machines stores a copy of requested data locally. This kind of cache system has two problems: the first one is that the cached data is a snap shot of the data at the time it is being cached and thus afterwards it has no way of knowing if the data in the original storage device has been updated; secondly, the same data gets cached in many client machines making it an inefficient mechanism for general applications. This approach deals with managing the web page cache memory inside the client machines while they access web pages from Internet web servers. However, web page access represents only a special class of application where occasional stale data is not a significant issue for most users. Users usually manually force the browser to ignore the data in the cache and go to the target web server for the updated data directly. Obviously, this approach cannot be applied to most other applications where data integrity and coherency are important like in real-time transaction based applications.

Another web caching mechanism used in the industry are web caching appliances. These devices are typically inserted in the network near the web clients. All web transactions pass through the web cache and if the web page accessed is not found in the web cache, the appliance forwards the web request to the originally intended web server. When the web server responds, the web cache will cache the reply for later queries to the same web objects by the same or different web clients. Using this mechanism, if the web cache is local and the web servers are remote, then web accesses can be satisfied in a much more timely manner. In addition, the web cache is made available to all web clients local to the cache appliance. The drawback of this approach is that is specific to web access and not to more generic storage access methods (file or block).

Other suggested cache mechanisms propose ways of increasing the cache hit rate by intelligently pre-fetching data into cache memory during low processing and/or network activity periods. These proposed schemes obviously work better for some applications like web page access and other sequential data access applications. Other cache mechanisms have developed complex schemes to manage distributed cache systems on local networks, which are difficult to configure and manage Their implementation may be efficient when both the requesting hosts and target devices are located in the same local network. However, when the requesting hosts and the target devices are geographically separated as in the Internet environment, their distributed cache scheme implementation may not always produce the desired performance gains due to the data transmission latency across wide area networks.

All of the cache mechanisms described above have several drawbacks in light of the goal to provide a generic but highly efficient file and block storage data cache mechanism for geographically dispersed networks. It is desirable to provide a high performance, efficient cache system and method for network storage and it is to this end that the present invention is directed.

SUMMARY OF THE INVENTION

The caching system and method built in accordance with this invention overcomes the above problems and limitations of existing cache systems. This invention addresses all of these problems by implementing a cache in the network near the storage devices and another cache in the network near the requesting hosts. Thus, frequently accessed data from a group of storage devices are cached in the system deployed near the storage subsystems. In addition, data frequently accessed by a group of hosts/clients are cached in the system deployed near the requesting host devices. This invention allows a network of arbitrary size to exist in between the host-side cache system and the storage-side cache system.

The cache systems are implemented in a manner that allows the most efficient processing of read requests to occur. Each read request initiated by a host would first be checked against the cached data in host-side cache system and be satisfied by that system if the requested data is present. If the host-side cache could not satisfy the read request, the read request is sent out to the storage-side cache. If a cache hit occurs at the storage-side cache system, the read request is satisfied by that system. If both cache systems fail to generate a cache hit for the read request then the request is forwarded to the target storage device to satisfy the read request. Thus, the slow access-time target storage device is only accessed to satisfy a read request if both the host-side cache system and the storage-side cache system cannot satisfy the read request. Thus, network traffic is reduced if a host-side cache hit occurs or target storage latency is reduced if the storage-side cache hit occurs. In the case where both caches do not contain the data, when the data is transmitted from the target storage device back to the initiating host, the data would preferably pass through and be stored in both the host-side cache as well as the storage-side cache for future use.

The caching system does not support separate write cache. However, when a write request occurs, the system on the storage side will use the written data to refresh its cache and the cache system on the host side will either use the data to refresh its cache or to simply invalidate the same data in the cache if it was already there. Moreover, the system on the host side will work with all other cache systems on the network that are on the same access zone to do the same update or invalidation operations for their caches.

Because of the way the cache systems may be deployed, the cache systems may be installed in strategic distributed locations throughout any arbitrary network between any hosts requesting data and any target storage devices providing the data. This network may be composed of local area networks (LANs), metropolitan area networks (MANs), wide area networks (WANs), storage area networks (SANs), or any combination of these network types. Therefore, regardless of the physical locations of the requesting hosts or the target devices, the two system caches on the data path between the requesting host and the target device in accordance with the invention will greatly increase the chance of being able to serve the requests with reduced network traffic and/or decreased access latency.

In accordance with a preferred embodiment of the invention, a special cache/SCSI card may be used to provide the cache. In particular, this card may have a large amount (4 Gbytes or more) of volatile memory (e.g. DRAM, SDRAM, RDRAM, etc.) installed to serve as primary cache storage and multiple disk drives (e.g. SCSI, ATA, IDE, etc.) may also be attached directly to the card to serve as secondary cache storage. A cache manager software program may be executed by a processor on this card and the manager may monitor the data traffic through the system and manage the local cache. The cache manager program also communicates with other cache managers running on the network to perform cache update or invalidation functions as described above.

At the target storage device side, a cache system keeps a large cache for all attached storage devices in the local storage network. Data requests from outside the local storage network can potentially be satisfied by drawing data from the cache and avoiding local accesses to the local storage devices. At the other end of the intermediate geographically dispersed network, another large cache is kept in the cache system for storing data that have been accessed by all local hosts in the past. Thus, future read requests for the same data will be satisfied by this cache system thereby totally eliminating traffic over the intermediate network.

Cache data invalidation, in accordance with this invention, may be initiated when one cache system detects a write request. The cache manager program automatically sends out messages to all other cache systems on the network for their cache managers to check and invalidate the blocks of data being stored in originator's cache. When writing a small amount of data, instead of invalidating the system caches on the network, it might be more efficient to just update those caches with the data. The cache system allows users to set a threshold value so that when the amount of data being written is smaller than that threshold value, the system may perform a cache update otherwise it may perform cache invalidation for all cache systems on the network.

For network attached storage (NAS) devices where data is accessed as network files rather than simply blocks of data, the cache system can also cache them in file-based caches the same way as other block-based caches.

In accordance with the invention, the cache system may be connected to zero or more hosts and/or zero or more targets. Depending of the targets and hosts connected to the cache system, the memory of the cache system is then appropriately partitioned. For example, a cache system that is connected to only target devices may have its memory configured as an SSC, a cache system that is connected to only host computers may have its memory configured as an HSC and a cache system that is connected to both hosts and targets may have its memory configured to be both an HSC and an SSC.

Thus, in accordance with the invention, a cache system is provided. The cache system comprises an arbitrary communications network and two or more cache systems connected to the communications network wherein each cache system is connected to at least one computer host or one storage device. Each cache system further comprises a first cache for servicing data requests for data stored on the storage devices associated with the cache system, a second cache for servicing data requests from computer hosts associated with the cache system and a cache manager for controlling the operation of the first and second caches.

In accordance with another aspect of the invention, a method for caching data being transferred between a first cache system and a second cache system connected together by a communications network is provided wherein the first and second cache systems each have at least one storage device and at least one computer host attached to them, and each cache system contains a storage device cache and a computer host cache. A computer host cache of the first cache system is checked upon receiving a read request from the computer host associated with the first cache system for data from the storage device of the second cache system to determine if the requested data is in the computer host cache. If the data is not in the computer host cache of the first cache system, the request is forwarded to the second cache system where the storage device cache is checked to determine if the requested data is in the storage device cache.

In accordance with another aspect of the invention, a method for caching data being transferred between a first cache system and a second cache system connected together by a computer network is provided wherein the first and second cache systems each have at least one storage device and at least one computer host attached to them, and each cache system contains a storage device cache and a computer host cache. The computer host cache of the first cache system is changed upon receiving a write request from the computer host associated with the first cache system to write data to the storage device of the second cache system. A message is sent to all of the computer host caches to change the computer host cache with the same data as the computer host cache of the first cache system or to invalidate the data in the cache. The storage device cache of the second cache system is then changed in response to the write request.

In accordance with yet another aspect of the invention, a cache unit for caching data between a computer host and a storage device is provided. The cache unit comprises a computer host cache for caching data requested by the computer host, a storage device cache for caching data stored on the storage device, and a cache controller for servicing the read and write requests from the computer host for data located on the storage device.

DETAILED DESCRIPTION OF A PREFERRED EMBODIMENT

Figure 1:
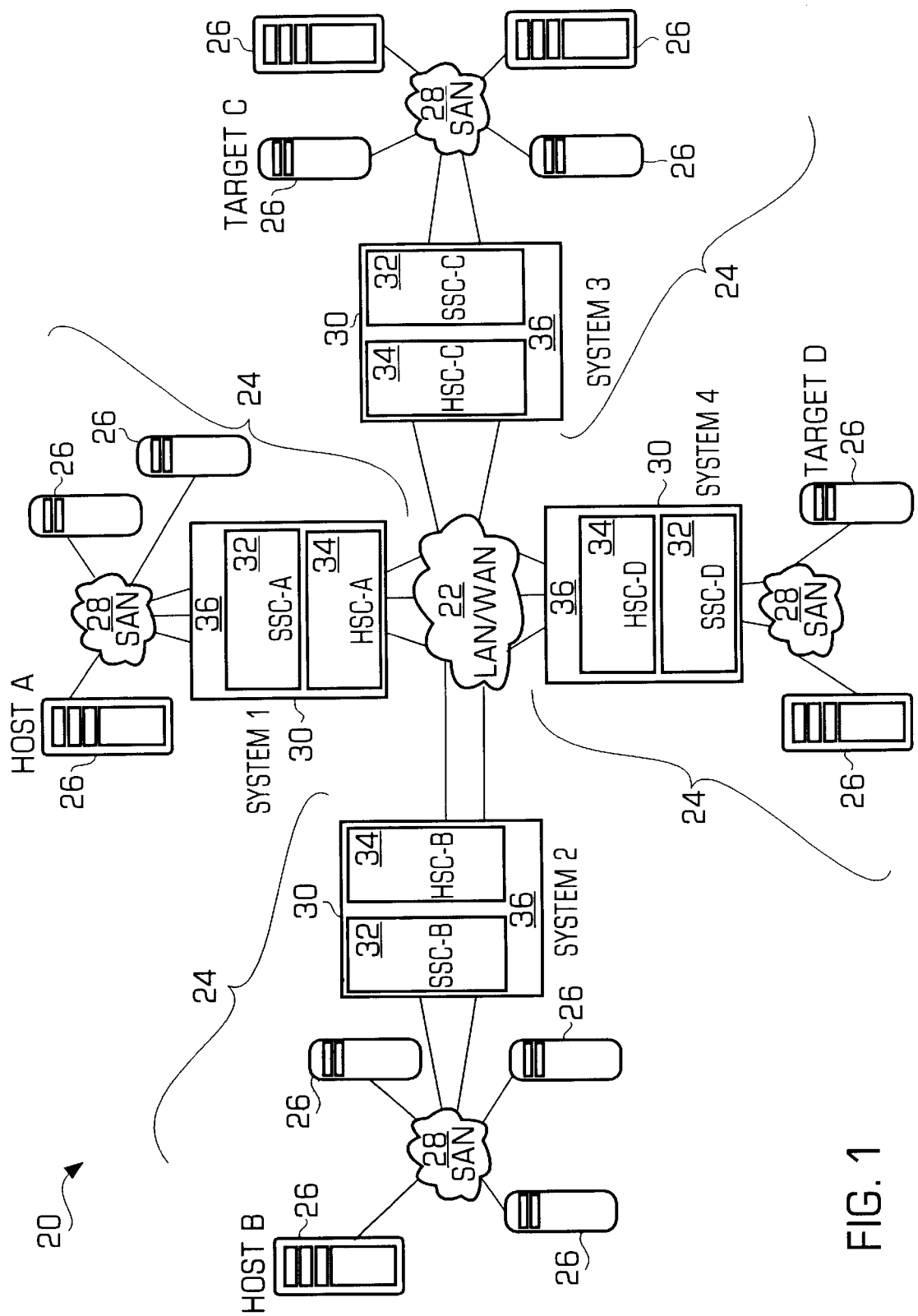
FIG. 1 is a diagram illustrating a networked computer environment with a block-based cache system in accordance with the invention.

The invention is particularly applicable to a cache system for a network and it is in this context that the invention will be described. It will be appreciated, however, that the system and method in accordance with the invention has greater utility.

The cache storage network system is a networking device that enables the sharing of functional and operational resources among all assets in a storage network system in a high performance manner.

The cache system, in accordance with the invention, creates an intelligent storage network without incurring a large investment for new infrastructure. It utilizes reliable protocols to guarantee delivery in traditionally unreliable LAN/WAN environments. The cache system interconnects local storage-centric networks based on Fibre Channel or SCSI to existing or new LAN/WAN IP-based networking infrastructures. The interconnection of these diverse network technologies allows storage networks to be deployed across geographically distributed environments. This deployment would not be possible with current pure storage network technology. Because the resultant network topology is geographically distributed, the cache system employs specific cache mechanisms and algorithms in order to improve storage access performance across the network from end-to-end.

The cache system provides high performance multinetwork connectivity for storage environments. This performance means that the cache system delivers transparent performance that seamlessly attaches devices across multiple interfaces while permitting each to deliver its full performance capability across the storage network. On the LAN connectivity side, the system supports standard TCP (Transmission Control Protocol) and IP (Internet Protocol) connectivity over IP networks. The FCP (Fibre Channel Protocol) and SCSI commands are translated into networking protocols, in which they are routed through the backbone, and the operation is transparent to the application layer software. The IP network is scalable and allows interconnected heterogeneous networks.

On the SAN connectivity side, the cache system supports connectivity of a wide range of host and storage types. Users share these resources efficiently in heterogeneous LAN/WAN and SAN environments.

The cache storage may be implemented in the cache system so that all the frequently used network or storage data is cached not only locally to the storage devices but also reflected to the requesters, or initiators, of the transactions per connected port. This differs from the pure disk-cache type of applications that only cache the data locally to the storage devices, thus only centralizing the data in a particular location in the network. The cache system will shorten the access time versus the available network bandwidth, if the accessed data is hit in the cache. To maintain the cache coherency, a user configurable cache scheme will be used to customize the implementation of the system which implements sophisticated cache algorithms.

The cache memory, in accordance with the invention, may be either solid-state memory or magnetic-mechanical type disk drives. The type of caching may be either file-based caching or block-based caching. A file caching implementation, in accordance with the invention, allows the cached data to exist in the host-side system or storage-side system, but the data may also be located anywhere inside the storage network infrastructure. Therefore, as long as the system maintains a fast locator for the cached file data, the physical location of the file data is irrelevant. The block caching implementation allows the cached data to be stored in the host-side system or the storage-side system and eliminates the need to access the data across bandwidth limited LAN, SAN or WAN networks.

When the cache system is enabled for each transaction, the network traffic is eliminated if a cache hit occurs in the host-side cache system. Traffic may occur when a cache miss occurs or when the caches are updated. In this sense, most of the data accesses are local to the initiators/requestors if the cache-hit rate is higher than the cache-miss rate. This reduces the dependency of network performance on the bandwidth of arbitrary communications networks and the network could be "collapsed" if the cache-hit rate is high.

The storage network switch system contains multiple line cards and cache/SCSI cards. Each line card may contain a predetermined number of ports, such as eight in a preferred embodiment, for connecting hosts, storage devices, and other switch or router devices. There are also multiple cache/SCSI cards in the system to provide cache storage for the system. All cards communicate and pass data among themselves through the high-speed switch fabric interface. During the system startup time, the system management function will assign line cards to each cache/SCSI card when multiple cache/SCSI cards are present. After the assignment, the cache manager runs on a particular cache/SCSI card becomes responsible for caching the data in and out of all the ports on the assigned line cards.

The system architecture is designed to provide storage access acceleration via proprietary caching mechanisms described herein. In general, data being read and passed through the system are also stored and indexed using one of the following three methods depending on the type of data and applications: the first one is the LRU (Least Recently Used) algorithm, the second one is a cache storage based on a pre-set time limit, and the third is marked as not to be cached at all. Subsequent read requests for the same data will be served from the cache rather than from the remote (slower) storage system. Now, the block-based cache system in accordance with the invention will be described in more detail.

Block-Based Cache

FIG. 1 is a diagram illustrating a networked computer environment 20 that may include a block-based cache system in accordance with the invention. The networked environment 20 may include a communication network 22, such as a local area network (LAN) or a wide area network (WAN), that connects together one or more computer systems 24 (shown as System 1, System 2, System 3, and System 4). Thus, the computer systems are connected together so that they may communicate with each other. In more detail, each computer system 24 may include one or more computer/storage systems 26, such as servers or disk-based RAID controllers, connected together by a storage area network (SAN) 28. Each computer system 24 may also include a cache system 30 that may include a storage-side cache (SSC) 32, a host-side cache (HSC) 34 and a cache manager 36. In a preferred embodiment, the cache manager 36 may include a piece of software being executed by the processor (not shown) of the cache system 30 that manages the cache in the cache system and communicates with the other cache managers of the other cache systems as described in more detail below. The cache system 30, as described in more detail below, reduces the data traffic over the networks since the data being requested or being written may be located in the cache so that data does not need to be sent across the network to satisfy the request. Now, the cache system will be described in more detail.

In particular, two classes of storage acceleration cache mechanisms may be supported in the cache systems 30 depending upon where the cache system is located in the network. As shown in FIG. 1, each cache system contains the two caches 32, 34 wherein one cache caches data delivered by all storage devices on the local storage area network (denoted as the SSC cache 32 in FIG. 1) and the other cache caches data being requested by all hosts on the local storage area network (denoted as the HSC cache 34 in FIG. 1).

Figure 2:
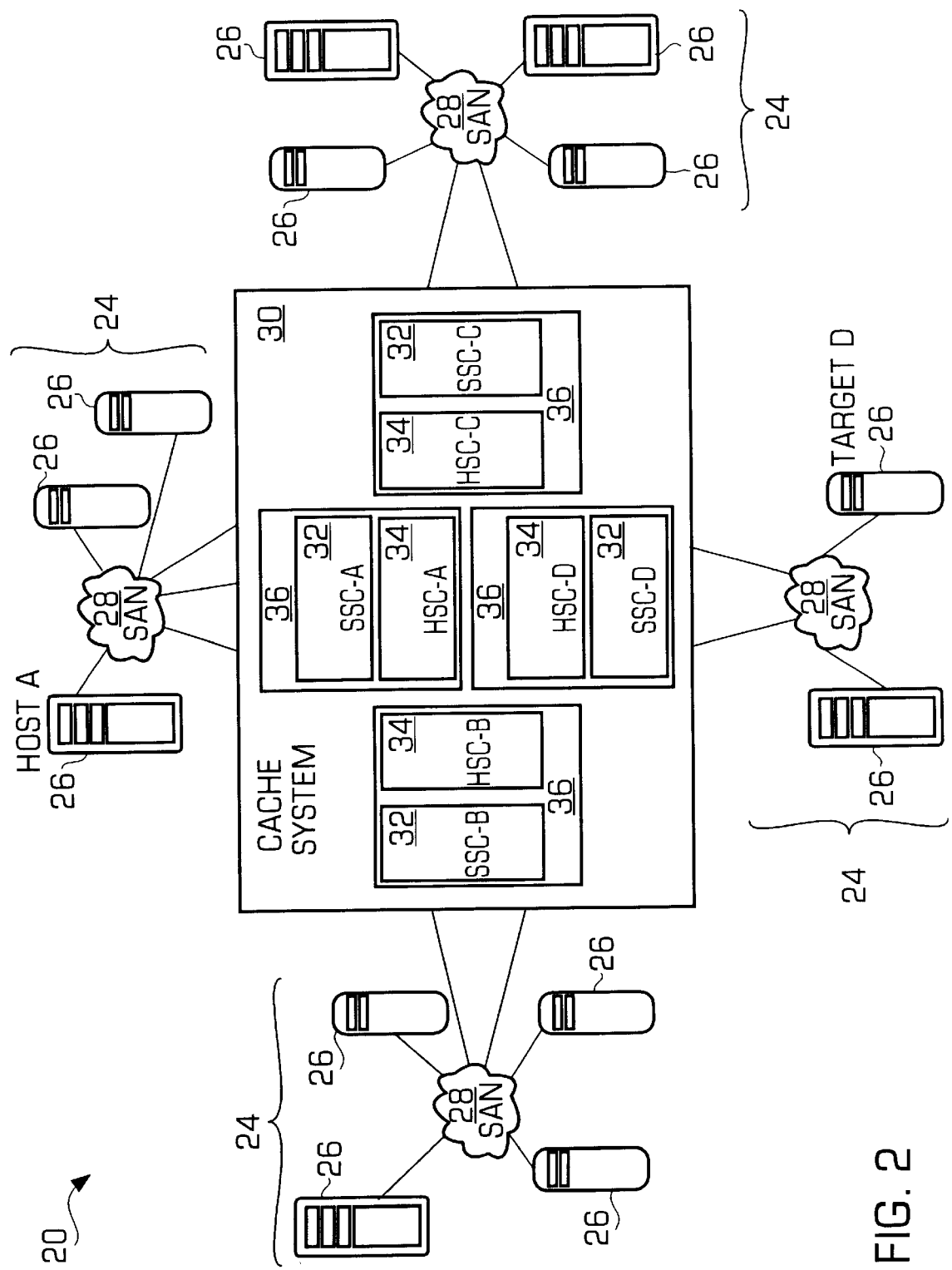
FIG. 2 is a diagram illustrating the integrated cache of the cache system shown in FIG. 1.

In operation, all hosts initiating the read/write requests for data and all target storage devices providing the data are located at the periphery of the central LAN/WAN 22 as shown in FIG. 1. The central LAN/WAN 22 can be viewed as the conduit for data passing to and from the computer systems 24 sitting at the ends of the data path wherein data is passed from one computer system to another computer system. Logically, a collapsed view of the cache systems is shown in FIG. 2 where the cache systems sit between any initiating host and any target device and the cache system has a large amount of cache storage. Thus, although the physical cache systems 30 are separated from each other by the LAN/WAN 22, they may be logically viewed as a single central cache system 30 that services the data read/write requests of the computer systems 24 while reducing the network traffic. Now, the SSC and the HSC caches will be described in more detail.

The Storage-side Cache (SSC) 32 refers to the cache that resides in the cache system 30 on the target data storage device side. In particular, regardless of where the original read requests come from, when data is being served out of the storage devices and passed through the cache system, the cache manager 36 of the cache system simply caches that data in the SSC. Because of the system architecture, the caching process is handled by a cache/SCSI card (a preferred hardware implementation of the cache system 30 shown in FIG. 3) that is running in parallel to the line cards that are responsible for moving the data from the target to the source. Therefore, there is no data traffic performance degradation when data has to be served out of the target storage devices.

The cache manager program in each cache system may then check all subsequent read requests arriving at this cache system and service the requests from the cache if the same block of data already existed in the cache. In such cases, the SSC cache 32 has essentially eliminated the delays associated with delivering data across the LAN/WAN network. When a write request that originated from a host connected to a locally attached SAN arrives at the cache system, depending on the user preset cache operation mode, the cache manager may either update the local copy of data in the SSC cache with the new data at the same time as the data was written to the target device, or for higher performance consideration, it may update the cache first, send confirmation back to the write initiating host and then write the data to the target device. Now, the Host-side cache (HSC) will be described in more detail.

The Host-side cache (HSC) refers to the cache that resides in the cache system on the data requesting host side. The cache manager program running on the cache/SCSI card in the cache system on the data requesting host side caches any data that passes through the local cache. Subsequent read requests from hosts attached to the same SAN as the cache system will be served from the cache if it is for the same blocks of data. Because this cache resides on the local storage network with the requesting host, it can potentially eliminate LAN/WAN data traffic and thus represents the shortest path for serving the requests and achieves a significant performance gain. In accordance with the invention, the same HSC cache is used to serve all hosts attached on the local storage area network. So, for hosts that are assigned to be on the same access 'zone', they share the same cache thus eliminating the need of keeping multiple copies of caches on those hosts containing similar or identical data.

For write operations, the HSC cache does either cache update or cache invalidation according to a user preset byte limit for the data being written. In most cases, where the number of bytes of data in the write request is significantly larger than the number of bytes in the write cache invalidation protocol, sending the data to all HSC cache systems on the network for cache data update may create congestion in network traffic. On the other hand, there are some applications like stock quotes, where each write request is only for a few bytes of data, then transmitting that data for HSC cache update does not add much overhead to the cache invalidation requests. In such cases, one would prefer performing cache update than cache invalidation.

Both write cache update and cache invalidation operations are performed cooperatively by the cache manager programs that reside on the cache systems belonging to the same group. The protocols are similar. The initiating cache manager needs to send the data type, the target device address, the device ID, the LUN ID, the starting block number and the number of blocks of the data in the write request. And for the cache update request, the actual data should follow. When the cache manager on the cache system actually detects a write request, it initiates either the cache update or the cache invalidation process. To do so, it first checks with the network manager program for the zoning information about all the other cache systems belonging to the same access zone on the network. Then, this initiating cache manager sends out the cache update or cache invalidation requests as described above to all those cache systems. Upon receiving the update or invalidation requests, the cache managers on those systems start updating or invalidating their own copies of the HSC caches, and send back a confirmation or acknowledgement message to the initiating cache manager.

Two options with respect to write cache update or cache invalidation are offered to the user depending on the user's configuration. The first is a strict synchronous mode (critical coherent mode) which does not forward the write request until all caches have been either updated or invalidated. The second is non-critical coherent mode which would execute the update or invalidation in parallel with performing the write. The non-critical coherent mode could be used in static web page servers where delayed invalidations would not matter as occasionally stale reads would be rare and would not be critical to the viewer of the web page. Now, a file-type caching mechanism that may be supported by the caching system in accordance with the invention will be described in more detail.

File-Based Cache

When network attached storage (NAS) type of storage devices are being accessed through the cache system, because they are being accessed as network file systems, the cache system will cache the data being read in the file system format used by the NAS server which is either the Microsoft CIFS/SMB or the UNIX NFSv3 format. This kind of NAS file cache is very similar in function to a Web cache. Note that the file system we use in the cache (CIFS/SMB or NFSv3) does not have to match the actual target NAS server's file system format because the cache manager presents the data to the NAS client in exactly the same format as the NAS server would over the network.

Because data is stored in the cache as files, the actual physical location of those files can be anywhere on the local network so long as the cache tag table can point to it. Making the attached SCSI disks on the cache/SCSI card an ideal storage for this type of cache. As described earlier in block-based cache systems, the same two types of cache also exist for the NAS file type caches, i.e. on the target NAS storage device side, we have the SSC file cache; and on the host side, we have the HSC file cache. In addition, the same considerations about invalidating data in the cache when a write operation occurs also apply to NAS file type caches. However, the network topology used in the preferred embodiment of file-based cache systems is slightly different than the topology used for block-based cache systems described earlier in this disclosure.

Figure 1A:
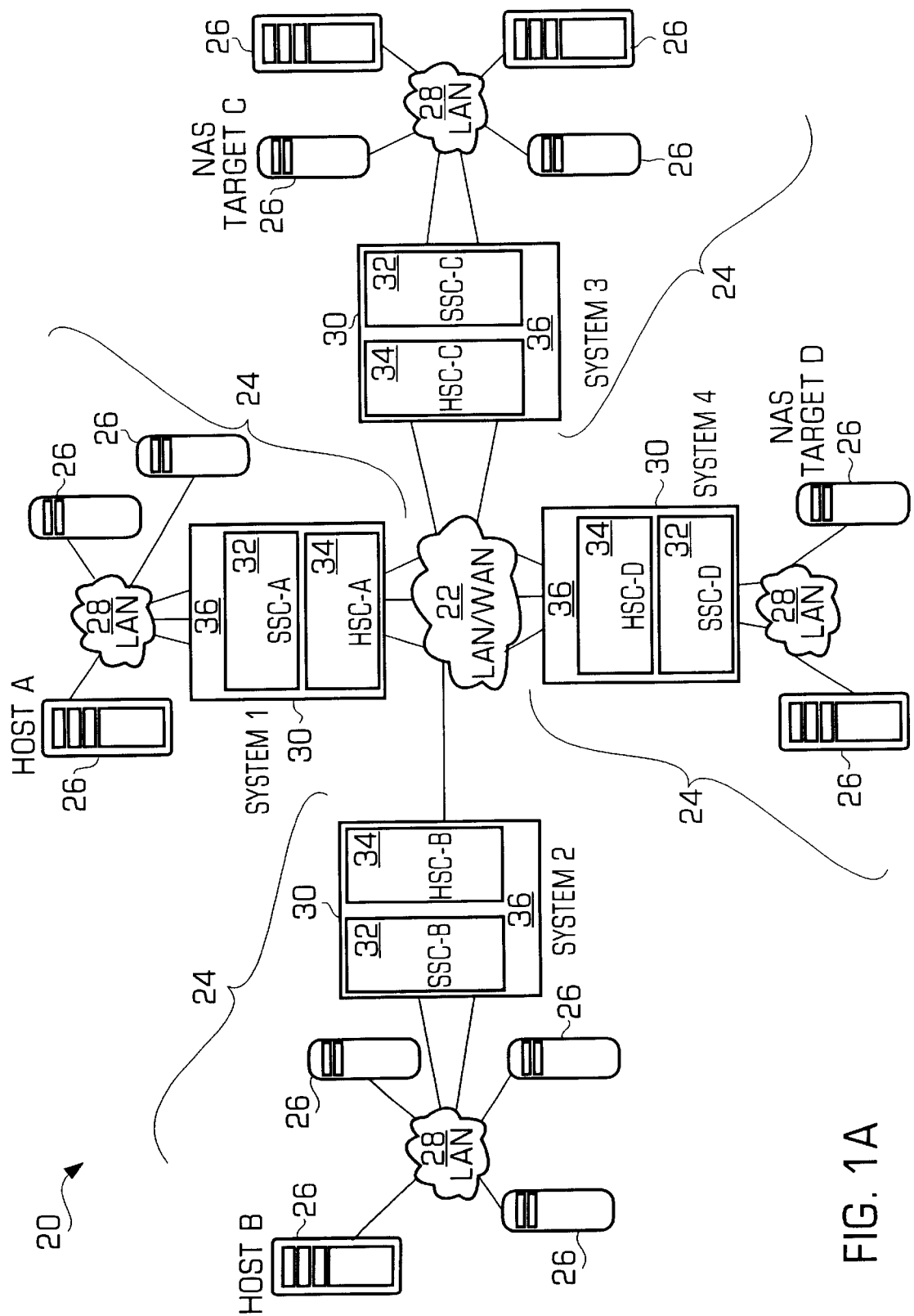
FIG. 1A is a diagram illustrating a networked computer environment with a file-based cache system in accordance with the invention.

FIG. 1A is a diagram illustrating a networked computer environment 20 that may include a file-based cache system in accordance with the invention. The networked environment 20 may include a communication network 22, such as a local area network (LAN) or a wide area network (WAN), that connects together one or more computer systems 24 (shown as System 1, System 2, System 3, and System 4). Thus, the computer systems are connected together so that they may communicate with each other. In more detail, each computer system 24 may include one or more computer/storage systems 26, such as servers or network attached storage controllers/servers, connected together by another LAN 28. Each computer system 24 may also include a cache system 30 that may include a storage-side cache (SSC) 32, a host-side cache (HSC) 34 and a cache manager 36. In a preferred embodiment, the cache manager 36 may a piece of software being executed by the processor (not shown) of the cache system 30 that manages the cache in the cache system and communicates with the other cache managers of the other cache systems as described in more detail below. The cache system 30, as described in more detail below, reduces the data traffic over the networks since the data being requested or being written may be located in the cache so that data does not need to be sent across the network to satisfy the request. Now, the operation of the cache system in accordance with the invention will be described.

In FIG. 1A, the operation of the two types of caches mentioned above are now described. When a first cache system (System 1 in FIG. 1) sees a read request issued by Host A for data stored in Target D (See FIG. 1), it first checks its local HSC-A cache for any matches. That check is made against a locally kept cache tag table file. The cache tag table file generally contains pointers into the cache for the particular set of data stored therein. The data is identified by the target storage device IP address, the file handle (or name), the data offset within the file, the number of bytes being requested, etc. If a match is found, the HSC cache serves the read request immediately using the data from the cache and the read request will not be forwarded to the LAN/WAN.

If there is no match in System 1's HSC-A cache, the read request will then be forwarded to the target cache system (System 4 in this example) where Target D device resides. Upon receiving the read request, the System checks for the requested data in the local cache SSC-D using another locally kept cache tag table file. If the data is found, it services the request with the data from the cache. Only when both cache managers fail to find matches in either HSC-A cache or SSC-D cache, the read request will be forwarded to the destination storage device, Target D. When the requested data is being sent back to the requesting device, the cache manager in System 4 will update the SSC-D cache and the cache manager in System 1 will update the HSC-A cache.

When Host A issues a write request to Target D device, the System 1 cache manager will first update or invalidate the data in its own HSC-A cache. Then, it will send messages to System 2, System 3 and System 4 on the network to signal for them to also update or invalidate the same data in the HSC-B, HSC-C, and HSC-D caches if the same data existed there. When System 4 receives the write request for its Target D, it will update the cache SSC-D. Similarly, when Host A tries to read data from Target C, System 1 will first try to satisfy the request through the cache HSC-A. If it fails, then System 3 will try to satisfy the request by the cache SSC-C. When Host B issues a read request for data stored on Target D, it will first try the cache HSC-B on System 2 and then SSC-D on System 4.

In addition to the two examples shown in FIGS. 1 and 1a, the cache system in accordance with the invention may also be implemented with one or more hosts, but no targets or one or more targets but no hosts. In particular, some networks may have one or more host computers located behind one cache system so that the cache system is primarily operating as a host side cache and also have one or more target devices that are located behind a second cache system so that the second cache system operates primarily as a source side cache. Thus, the number of hosts or targets connected to the cache system may be varied in accordance with the invention. For example, if a cache system has only targets connected to it, then the cache system may configure itself (using the cache manager) or be configured (upon set-up or some other time) so that the entire memory space of the cache system is dedicated to SSC. On the other hand, if a cache system has only hosts connected to it, then the cache system may configure itself (using the cache manager) or be configured so that the entire memory space of the cache system is dedicated to the HSC. If the cache system performs as an HSC and a SSC, then the memory space is apportioned appropriately to perform as an HSC and an SSC. Now, the preferred implementation of the cache system in accordance with the invention will be described.

Preferred Implementation

The cache system may be preferably implemented using a specially designed cache/SCSI card. The card provides multi-Gigabytes of primary cache system memory and multiple attached SCSI disks as secondary cache storage. A cache management program is run on the card's processor(s) to manage the cache system. The cache manager is responsible for monitoring the data traffic, mapping data into the cache storage, purging data from the cache memory when it becomes full, and updating the cache tag tables. It accomplishes these tasks by working closely with the local line card control processes as well as cache managers running on other cache systems on the network.

When a line card receives a read request targeted at one of its ports (as for System 4 in FIG. 1), it first checks the request against a locally kept cache tag table for any hits. The cache tag table contains pointers to the data stored in the cache. For block-based cache systems, each cache entry is identified by its target device address, device ID, device LUN ID, data block number, and data length. For file-based cache systems, each cache entry is identified by its target IP address, file identifier (or name), file offset, and data length. Both the cache tag table file and the cache storage are being maintained by the cache manager program. For performance consideration, copies of the cache tag table file are made by the cache manager and are stored on all its associated line cards' local memory. If a line card detects a cache hit, it sends the request to the cache/SCSI card for it to complete the read request with data from its cache. In that case, the cache manager has to assemble the data so that it looks as if the data were sent out from the original target storage device where the actual data resides.

If there is no match, the line card gets the data from the target device, sends the data back to the originating requestor. It also forwards the request and its data to the cache/SCSI card. After receiving the request, the cache manager first checks to see if there is any more space available to cache the data. If the available space is not enough, the cache manager has to decide on purging some old data blocks from the cache. Then the cache manager stores the data into the cache. Finally, the cache manager notifies all its associated line cards to update their cache tag table files to add new entries for the new data and to invalidate the old data if they get purged. Now, the card with the cache manager in accordance with the invention will be described in more detail.

Figure 3:
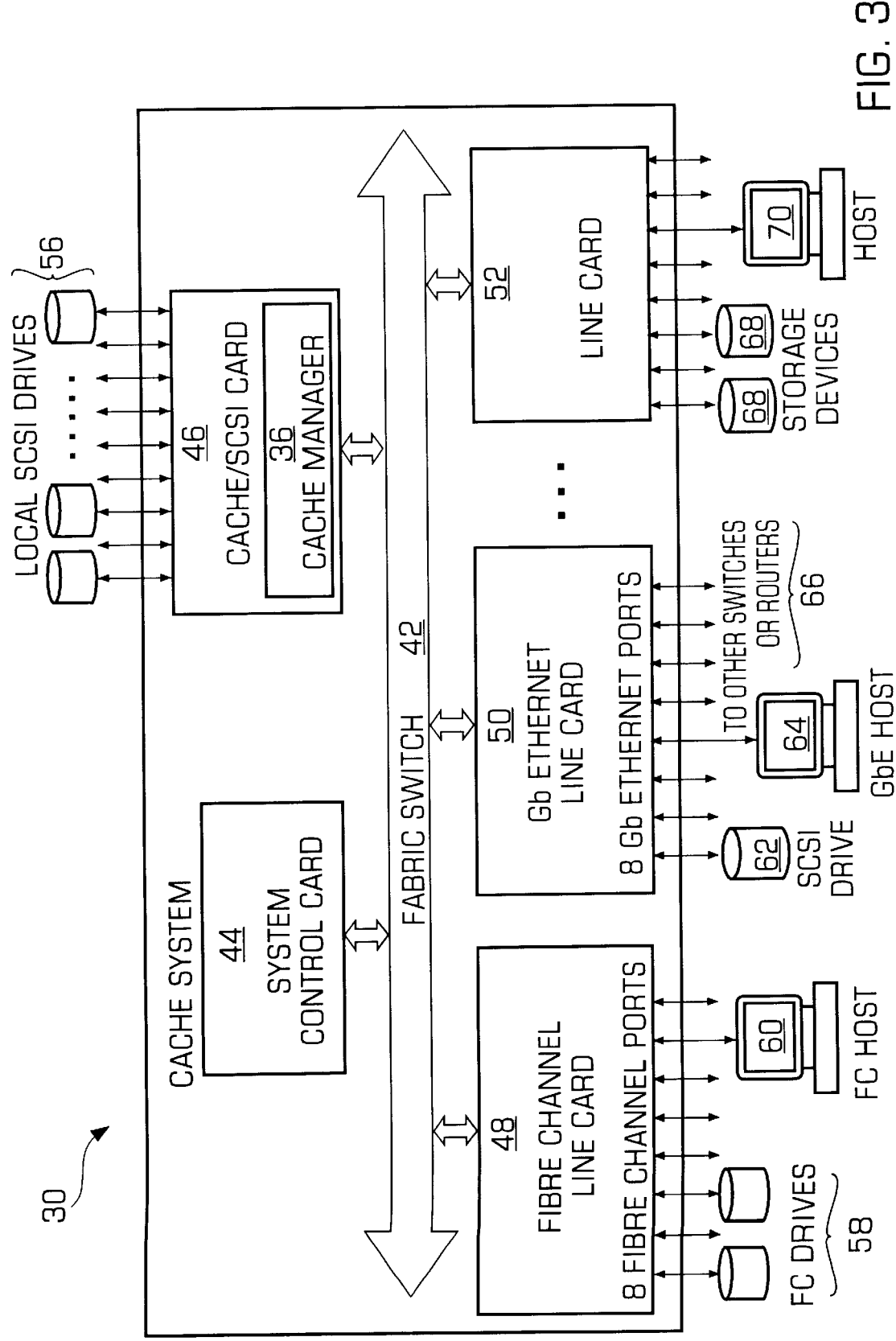
FIG. 3 is a diagram illustrating the cache manager in accordance with the invention.

FIG. 3 is a diagram illustrating more details of a preferred embodiment of a cache system 30 in accordance with the invention. The cache system 30 contains a system control card 42, one or more cache/SCSI card 46, and one or more line card 52. Two types of line cards are shown in the Figure: a Fibre Channel line card 48, and a Gigabit Ethernet line card 50. The cache system 30 may be connected to other communication networks and then to other cache systems through any of the line card ports 66. The cache/SCSI card 46 may further include the cache manager 36 that may preferably be one or more pieces of software that are being executed by a processor of the cache/SCSI card 46 to control the operation of the cache. The cache manager 36 may control the read and write operations of both the SSC cache and the HSC cache that are associated with each cache system. The system control card 44 may control the overall operation of the cache system 30 including, for example, access to the fabric switch, communication protocols and other general operations.

The cache/SCSI card 46 may include the cache manager, whose operation is described below with reference to FIGS. 4–9, as well as fast access DRAM, SDRAM, or RDRAM memory chips to provide a portion of the cache storage of the particular cache system. The cache/SCSI card may also be connected to one or more external persistent storage devices 56, such as hard disk drives, optical drives, tape drives or the like, that may also provide cache storage space. However, the persistent storage devices may typically have a slower access time than the DRAM. In accordance with the invention, each cache system 30 may have a very large amount of cache storage space when the DRAM is used in combination with the external persistent storage devices that can be easily expanded.

The one or more other cards 48, 50, 52 in the cache system 30 connect the cache system 30 with the various computer systems in the storage network that are connected to the cache and control the data transfers wherein the cache services the write and read requests of those computer systems. As shown, the Fibre Channel line card 48 may connect the cache system, using one or more Fibre Channel ports, to one or more Fibre Channel drives (FC drives) 58 and one or more Fibre Channel (FC) hosts 60. Similarly, the Gigabit Ethernet line card 50 may connect the cache system 30, using one or more ports, to, for example, a hard disk drive 62, a GbE (Gigabit Ethernet) host 64 and one or more other switches or routers 66. The line card 52 may connect the cache system 30 to one or more storage devices 68 and a host computer 70. These cards connect various different types of computer networks together so that the cache system may be operated with various different types of computer networks. Now, the details of the cache management method carried out by the cache manager 36 in accordance with the invention will be described.

Figure 4:
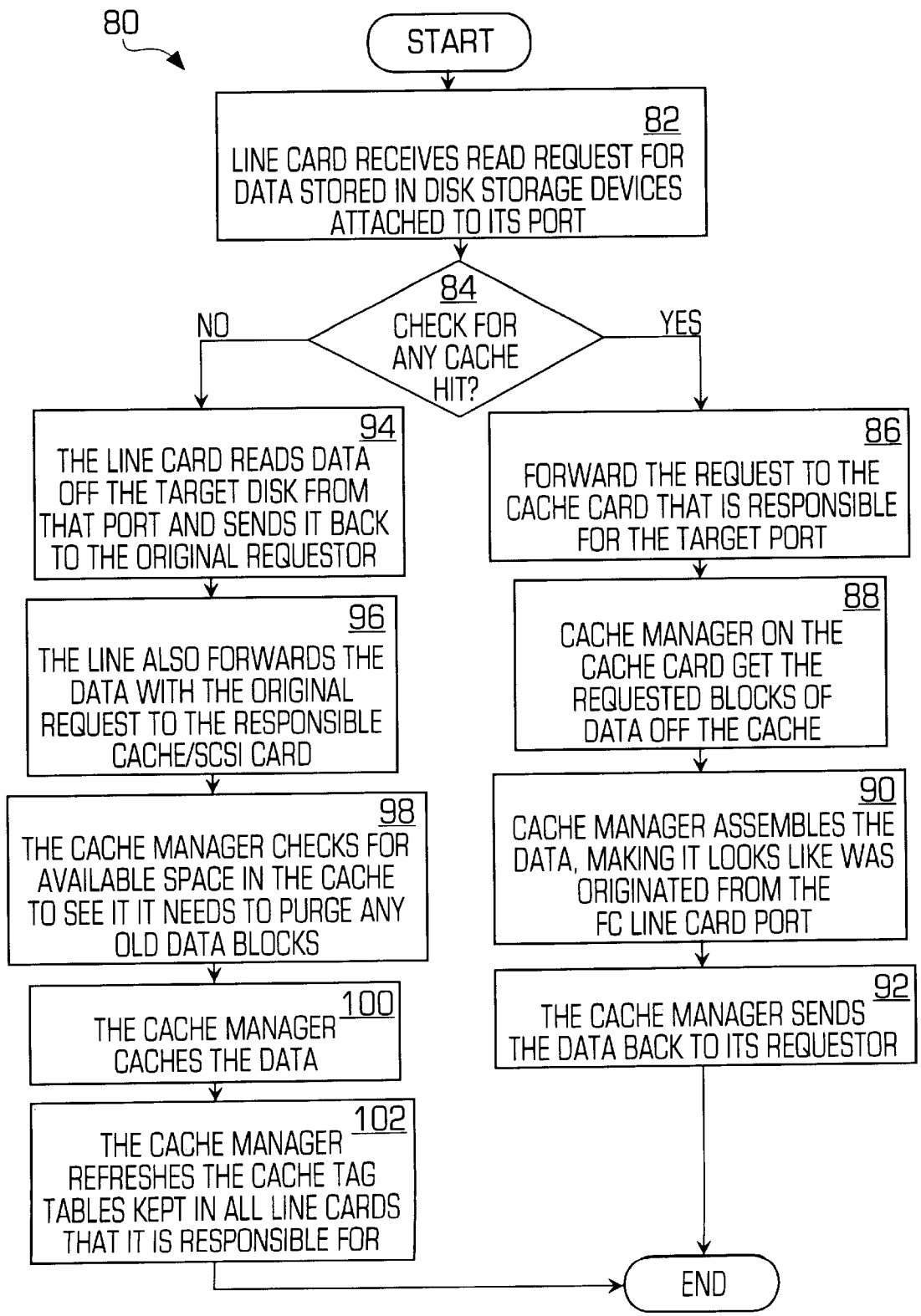
FIG. 4 illustrates a cache management method of a storage-side cache (SSC) for read requests in accordance with the invention.

FIG. 4 illustrates a cache management method 80 of a local storage area cache (SSC) for read requests in accordance with the invention that is carried out by the cache manager of the cache system. In step 82, the line card of the cache system may receive a read request for data stored in the disk storage devices attached to the port of the line card. In step 84, when a cache system line card receives a read request targeted at one of its ports (as for System 4 in FIG. 1), it first checks the request against a locally kept cache tag table for any hits. The cache tag table contains pointers to the data stored in the cache. For block-based cache, each cache entry is identified by its target device address, device ID, device LUN ID, data block number, and data length. For file-based cache, each cache entry is identified by its target IP address, file identifier (or name), file offset, and data length. Both the cache tag table file and the cache storage are being maintained by the cache manager program. For performance consideration, copies of the tag table file are made by the cache manager and are stored on all its associated line cards local memory.

If a cache hit occurs (e.g., the requested data is located in the SSC cache and is valid data), then the read request is forwarded to the cache card that is responsible for the target port in step 86. In step 88, the cache manager on the cache card may retrieve the requested block of data (or files in file-based caching is used) from the predetermined cache location based on a cache location table. In step 90, the cache manager may assemble the data to make it look more like it was originated from the original target storage device attached to a target Fibre Channel line card port. In step 92, the cache manager may send the data back to the requestor so that a read of the slower target device is not needed and the data traffic associated with the read request is eliminated.

If a cache hit does not occur (e.g., the requested data is not located in the SSC cache), then the line card reads the requested data from the target disk and sends the data back to the requestor in step 94. In step 96, the line card may forward the requested data along with the original request to the cache manager responsible for the target device. In step 98, the cache manager may check for available space in the SSC cache to see if, to store the current requested data, the cache manager needs to purge old cache data using either a typical least recently used cache data replacement algorithm or alternatively using pre-set time limits depending on their data types. Following step 98, the cache manager has space for the requested data (either by purging some old data or because space already exists in the cache) so that the cache manager caches the data in step 100. In step 102, the cache manager refreshes the cache tag tables kept in all of the line cards responsible for the target device so that, for future data requests, the line cards have a current table of the data in the cache. In other words, the cache manager notifies all its associated line cards to update their cache tag table files to add new entries for the new data and to invalidate the old blocks if they get purged. Now, a method for SSC cache management during a write request will be described.

Figure 5:
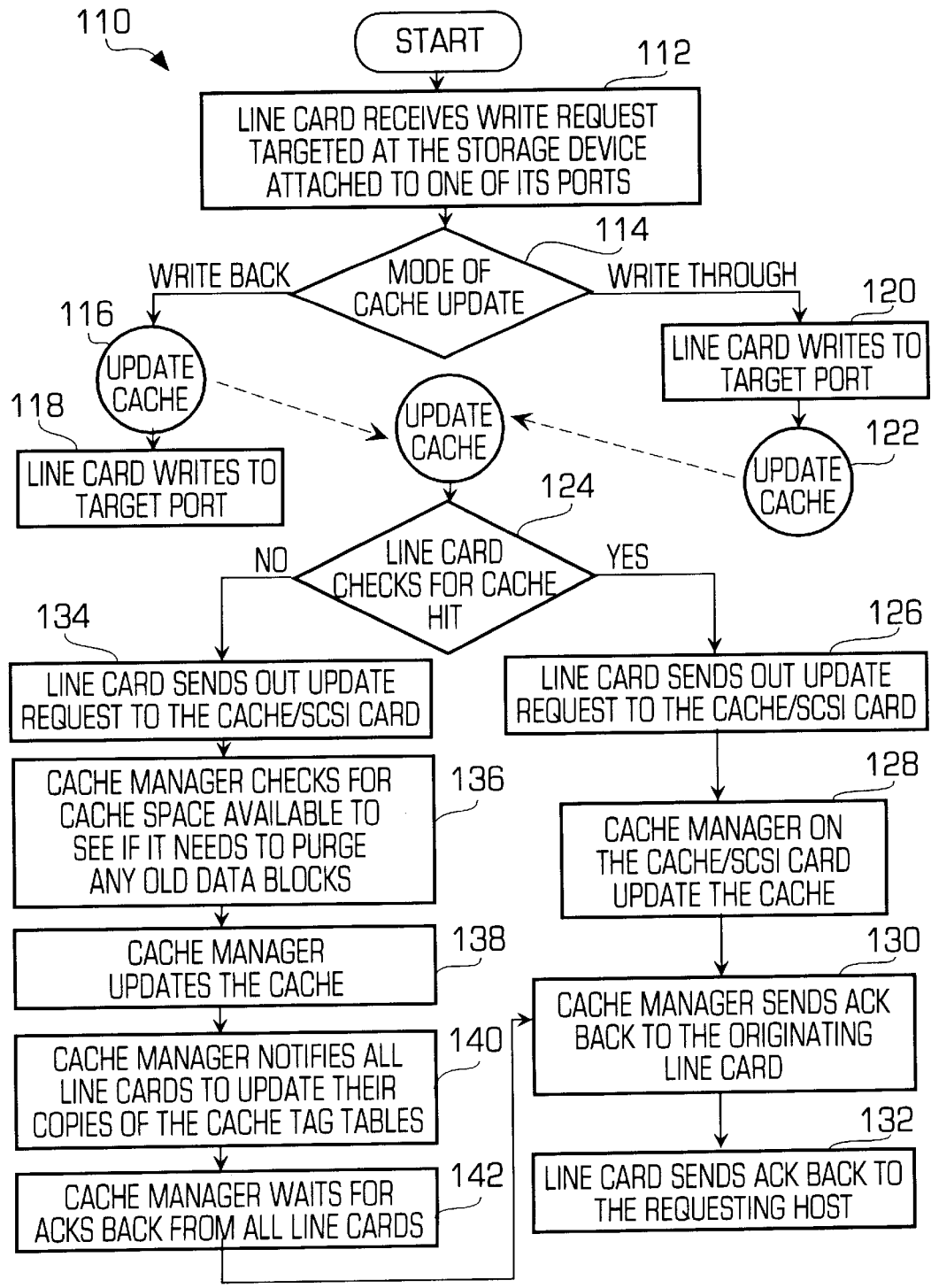
FIG. 5 illustrates a cache management method of a storage-side cache (SSC) for write requests in accordance with the invention.

FIG. 5 illustrates a cache management method 110 of a local storage area cache (SSC) for write requests in accordance with the invention. In step 112, the line card receives a write request targeted at a storage device attached to one of the ports of the line card. When the line card receives a write request targeted at the storage device attached to one of its ports, it first checks the mode for cache update set by the user in step 114. The mode can be either "critical coherent" or "non-critical coherent" and it determines the order of cache update and the actual write to the target device. In the "critical coherent" mode, the cache manager may update the cache first in step 116 before allowing the line card writes to the target device in step 118. In the "non-critical coherent" mode, the line card gets to write to the target device first in step 120 and then the cache manager updates the cache storage in step 122. Now, the actual cache update process will be described in more detail.

The cache update process starts by checking for a cache hit in step 124. If a cache hit was found (e.g., the same data, though old, already exist in the cache), the cache manager may update the cache data with the new data. Thus, in step 126, the line card may send out an update request to the cache manager. In step 128, the cache manager may update the cache. The cache manager may send an acknowledgement back to the originating line card in step 130, and the line card sends an acknowledgement back to the original requesting host in step 132.

If there was no cache hit (e.g., the current data does not exist in the cache) then the cache manager has to try to store the data into the cache. In step 134, the line card sends out an update request to the cache manager and the cache manager checks for available cache space for the new data in step 136. If there is not sufficient space is the cache, then the cache manager has to purge old data from the cache as described above. In step 138, the cache manager updated the cache with the new data and then the cache manager notifies all its associated line cards to update their copies of the cache tag tables in step 140. In step 142, the cache manager waits for the acknowledgment signals back from all of the line cards. Then, in steps 130 and 132, the cache manager sends an acknowledgment signal to the originating line card and the line card sends an acknowledgment signal back to the requesting host. Now, a method for HSC cache management during a read request will be described.

Figure 6:
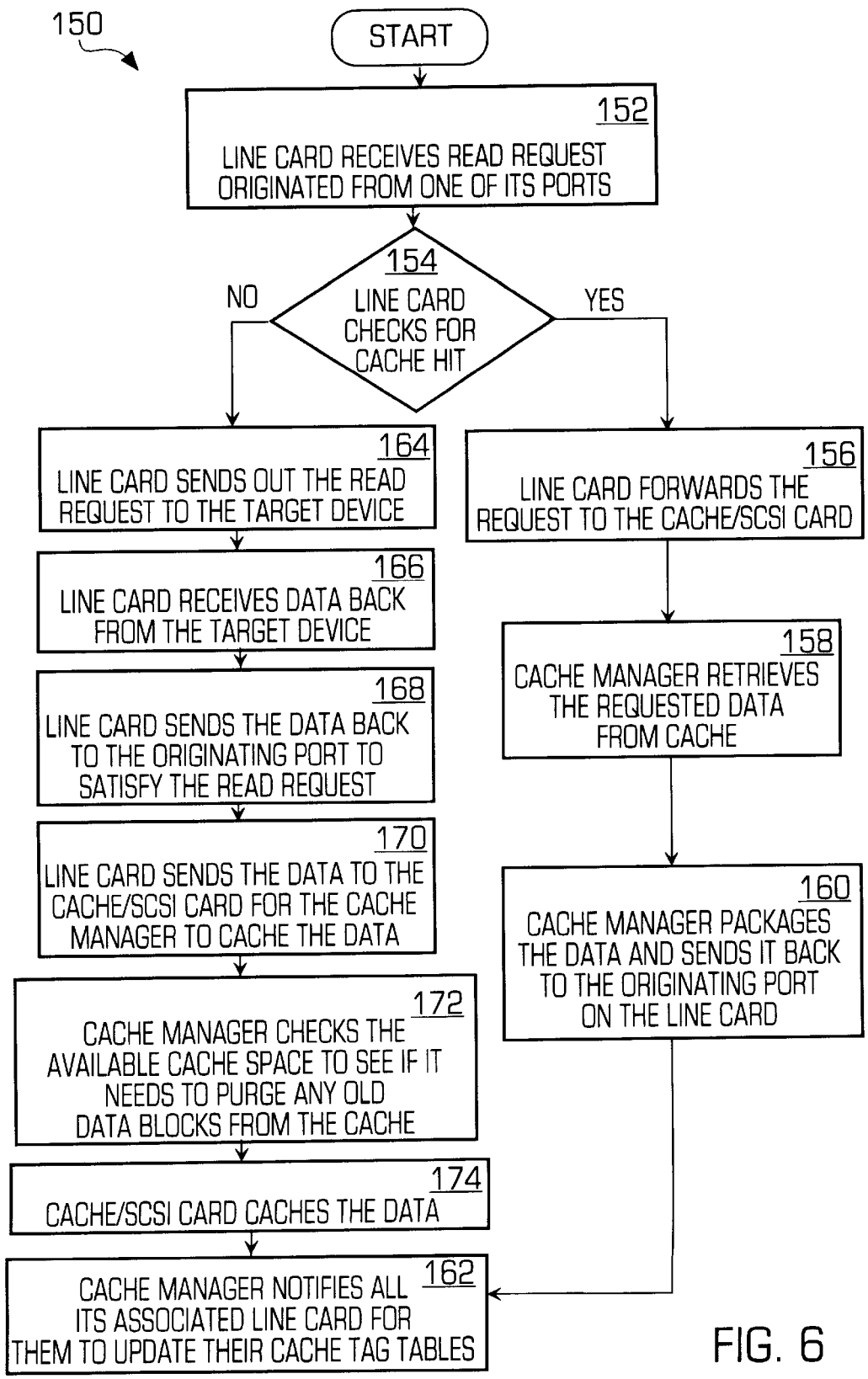
FIG. 6 illustrates a cache management method of a host-side cache (HSC) for read requests in accordance with the invention.

FIG. 6 illustrates a cache management method 150 of a requested data storage cache (HSC) for read requests in accordance with the invention. In step 152, when a line card receives a read request from a host attached to one of its port, it checks the request against a locally kept HSC cache tag table in step 154 to determine if there is a cache hit. If there is a hit, the line card forwards the request to the cache/SCSI card and the cache manager in step 156 so that the cache manager can satisfy the read request. The cache manager program running on the cache/SCSI card then retrieves the requested data from the cache storage in step 158, assembles it by adding headers to it to make it look like it originated from the target storage device in step 160 and then sends it back to the requesting host on the originating line card. In step 162, the cache manager may notify all of its associated line cards to update their cache tag tables with the new information.

If the line card determines that the requested data blocks are not in the cache, then it sends out the read request to the target device in step 164 and waits for the data coming back from the remote target device. Note that the request may either be satisfied by the target device itself or by the remote cache system's SSC cache if the requested data is already cached there. When the requested data comes back to the originating line card in step 166, the line card sends the data back to the original requesting host in step 168 and it also routes the data to the cache/SCSI card for the cache manager to store the data into the cache in step 170. Before doing it, the cache manager has to check for the available space in the cache to see if the data can fit in there in step 172. If the space available is not enough, the cache manager has to decide on purging old data from the cache. The cache manager then stores the data in the cache in step 174. The cache manager then works with all its associated line cards to update the cache tag tables stored there for the newly added data blocks in step 162.

Figure 7:
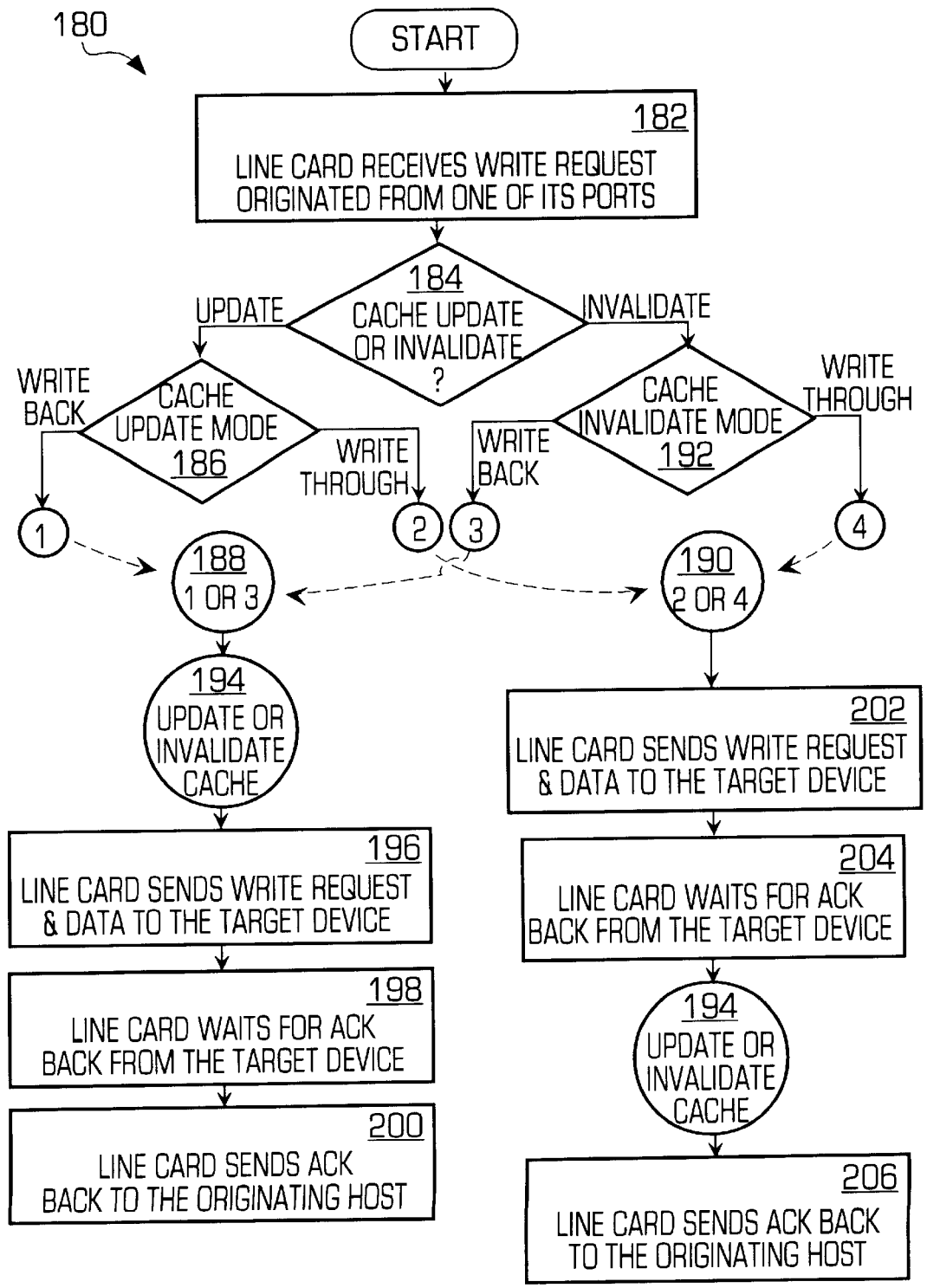
FIGS. 7–9 illustrate a cache management method of a host-side cache (HSC) for write requests in accordance with the invention.
Figure 8:
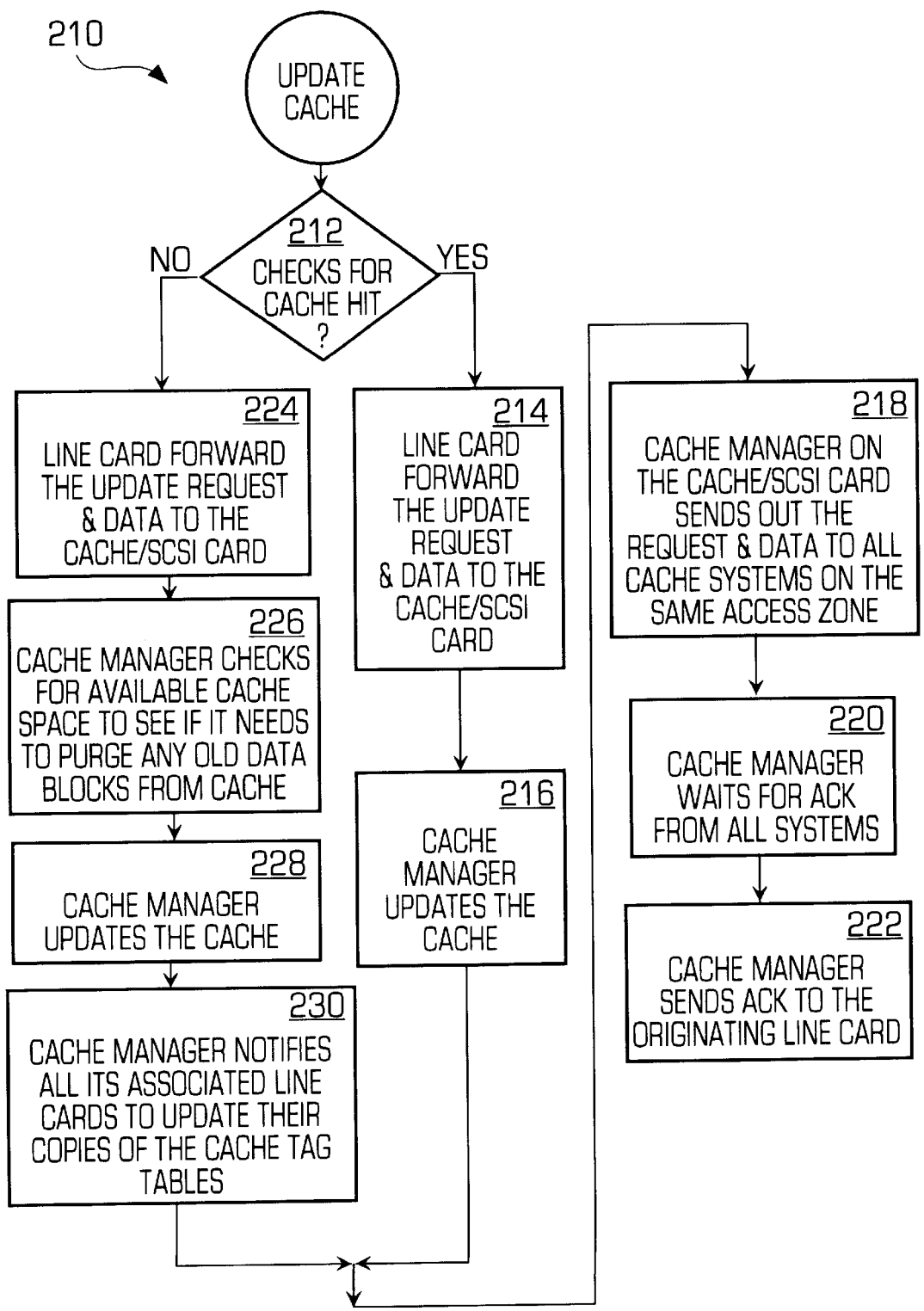
Figure 9:
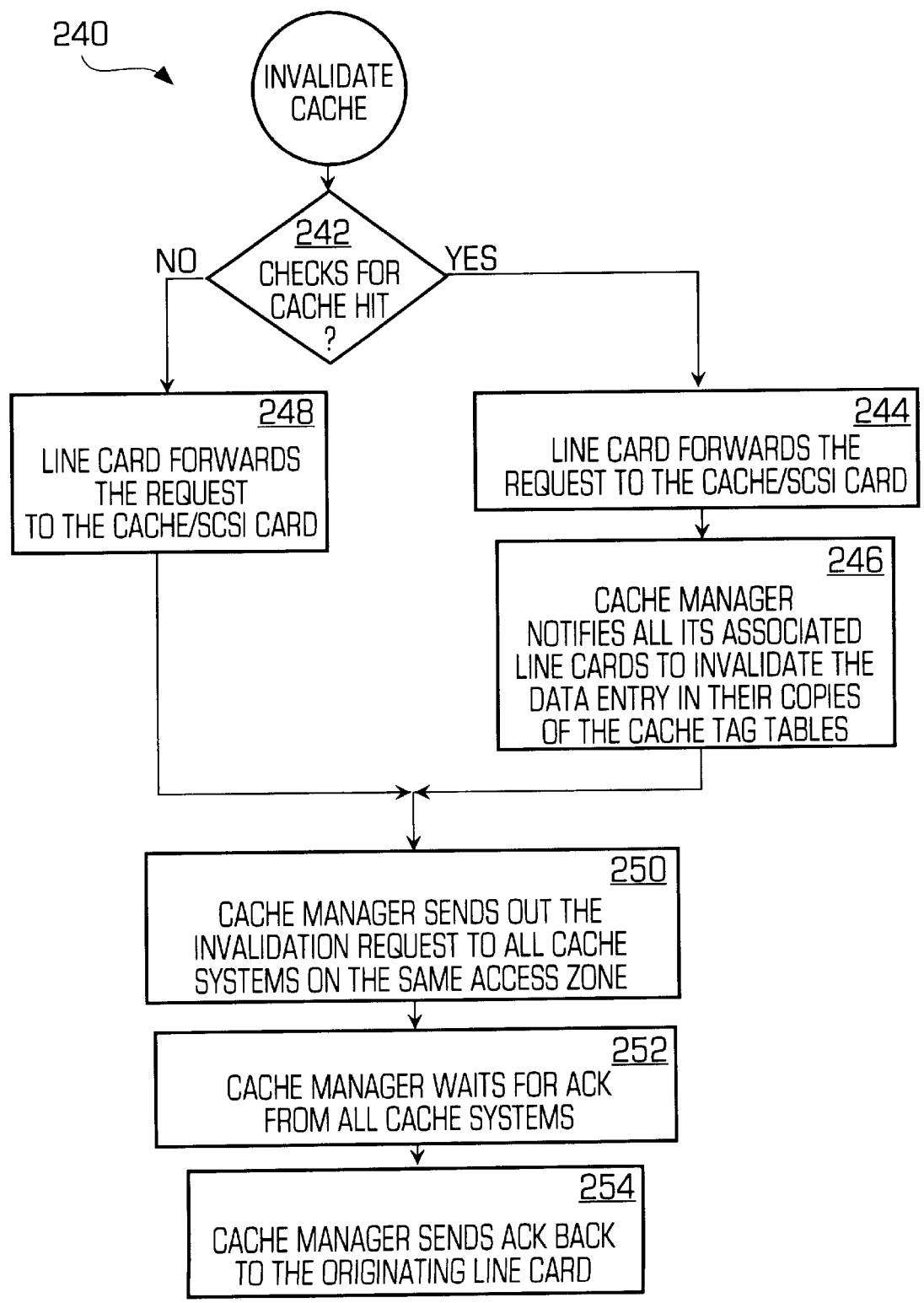

FIGS. 7–9 illustrate a cache management method 180 of a requested data storage cache (HSC) for write requests in accordance with the invention. When the line card detects a write request from a host attached to one of its ports in step 182, it checks with the management function on the System Controller card for two things: one is the byte limit for cache invalidation and update, and the other one is whether the cache is in the cache update mode or the invalidation mode in step 184. The byte limit tells the cache manager, when a write request occurs, if the amount of data exceeds the limit, then perform only global HSC cache invalidation whereas if the amount of data to be written is less than the byte limit, then perform global HSC cache update instead. The cache update or invalidation mode, on the other hand, determines whether to perform the update or invalidation in either "critical coherent" or "non-critical coherent" fashion.

In the "critical coherent" mode, the cache gets updated or invalidated before the data gets actually written to the target device. In the "non-critical coherent" mode, data gets written to the target device first, and then the cache gets either updated or invalidated. Thus, if the update mode has been chosen, then the cache update mode is determined in step 186. If the critical coherent mode is selected, then the method goes to step 188 whereas, if the non-critical coherent mode is selected, the method goes to step 190. Returning to step 184, if the cache invalidation mode is selected, the method may determine the cache invalidation mode in step 192. As with the cache update mode, if the critical coherent mode is selected, then the method goes to step 188 whereas, if the non-critical coherent mode is selected, the method goes to step 190.

If the critical coherent mode is selected from cache update or cache invalidation, then the method updates or invalidates the cache in step 194 as will be described in more detail below with reference to FIGS. 8 and 9. In step 196, after the cache has been updated or invalidated, the line card sends a write request and the data to the target device. In step 198, the line card waits for an acknowledgment back from the target device. In step 200, the line card sends an acknowledgment back to the originating host. If the non-critical coherent mode is selected, then in step 202, the line card sends a write request and the data to the target device. Then, the line card waits for an acknowledgment from the target device in step 204. Then, the cache is updated or invalidated in step 194. In step 206, the line card sends an acknowledgment back to the originating host. Now, the cache update method in accordance with the invention will be described in more detail.

FIG. 8 is a diagram of the cache update method 210 in accordance with the invention. To update the HSC cache, the line card that receives the write request first checks the write request against the locally kept cache tag table for any cache hit in step 212. If a cache hit was found, the line card forwards the write request plus all the data to be written to the cache/SCSI card for the cache manager on it to update the cache in step 214. In step 216, the cache manager updates the cache. In step 218, the cache manager on the cache card sends out the write request and the data to all of the cache systems in the same access zone. In step 220, the cache manager waits for the acknowledgment from all of the cache systems. In step 222, the cache manager sends an acknowledgment signal back to the originating line card.

If no cache hit was detected, the line card also forwards the write request plus its data to the cache/SCSI card in step 224. In this case, the cache manager first checks the available space on the cache to see if it needs to make some more room for the data by purging some old data blocks from the cache in step 226. Then the cache manager adds the data to the cache in step 228, and finally it notifies all its associated line cards to update their copies of the cache tag tables stored there in step 230. As with the cache hit, steps 218–222 are performed in which, once this process is done locally, the cache manager sends out the same request and data to all cache systems on the network belonging to the same access zone for the cache managers on them to perform the same task as describe above. The originating cache manager waits for acknowledgment from all other cache systems, before it sends acknowledgment back to the originating line card and the originating host. Now, the cache invalidation method in accordance with the invention will be described.

FIG. 9 illustrates a cache invalidation method 240 in accordance with the invention. For cache invalidation, the process is very similar to the cache update. In particular, the line card first checks for cache hit in step 242. If there is a cache hit, the line card forwards the request (no data is needed) to the cache/SCSI card in step 244. Then the cache manager on the cache/SCSI card notifies all its associated line cards to invalidate the data entry on the cache tag tables kept locally in step 246. If there is no cache hit, then there is no need to invalidate any data entries in the local cache and the line card simply notifies the cache/SCSI card of the write request in step 248. This concludes the local cache invalidation process.

After the local HSC cache has been invalidated, the cache manager sends out the invalidation request to all cache systems that are on the same access zone in step 250, so that the cache managers on those cache systems may perform the same invalidation task as described above. The originating cache manager then waits for receiving the acknowledgements from all cache systems in step 252, and then it sends an acknowledgement back to the originating line card and to the requesting host in step 254. In this manner, cache invalidation during a write request is performed in accordance with the invention.

In summary, the cache system in accordance with the invention provides a cache in the system near the target devices and another cache in the system at the requesting host side. Thus, frequently accessed data from a group of storage devices are cached in the system deployed at the target side and frequently accessed data by a group of initiating hosts are cached in the system deployed at the host side. Thus, data traffic across a computer network is reduced when a cache hit occurs. If a cache miss occurs, the system may then store the data in the caches to prevent future cache misses.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A cache system, comprising:

a computer network;

two or more cache systems connected to the computer network wherein each cache system is connected to at least one computer host and at least one storage device;

each cache system further comprising a storage-side cache (SSC) for servicing data requests for data stored on the storage device associated with the cache system, a host-side cache (HSC) for servicing data requests from computer hosts associated with the cache system and a cache manager for controlling the operation of the first and second caches; and wherein the cache manager further comprises means for performing a read operation on the HSC and means for performing a write operation on the HSC and wherein the write performing means further comprises means for determining a write operation byte limit, means for invalidating the HSC in response to a HSC cache write if the number of bytes in the cache write exceeds the write operation byte limit and means for updating the HSC cache in response to a HSC cache write if the number of bytes in the cache write does not exceed the write operation byte limit.

2. The system of claim 1, wherein the cache manager further comprises means for performing a read operation on the SSC and means for performing a write operation on the SSC.

3. The system of claim 2, wherein the SSC read performing means further comprises means for checking a cache tag table stored in the SSC to determine if a cache hit has occurred when data is read from the storage device, means for serving the data from the SSC if a cache hit occurs, means for reading the data from a storage device if a cache miss occurs.

4. The system of claim 3, the storage device reading means further comprises means for updating the SSC with the data read from the storage device and means for updating the cache tag table associated with the SSC to reflect the data read from the storage device.

5. The system of claim 4, wherein the SSC updating means further comprises means for determining the available space in the SSC and means for purging least recently used data from the SSC if sufficient space is not available.

6. The system of claim 2, wherein the SSC write performing means further comprises means for determining a user configurable cache update mode of operation selected from a non-critical coherent mode wherein the data is written to the storage device before the cache is updated and a critical coherent mode wherein the cache is updated and then the data is written to the storage device.

7. The system of claim 6, wherein the SSC write performing means further comprises means for checking a cache tag table to determine if a cache hit occurs, means for updating the data in the cache if a cache hit occurs, means for storing the data in the cache and means for updating the cache tag table.

8. The system of claim 7, wherein the storing data means further comprises means for determining the available space in the cache and means for purging either the least recently used data from the cache or the data that have been expired according to the pre-set cache time limit, depending on their data types, if sufficient space is not available.

9. The system of claim 1, wherein the read performing means further comprises means for checking a cache tag table stored in the HSC to determine if a cache hit has occurred when data is requested by at least one computer host, means for serving the data from the HSC if a cache hit occurs, means for reading the data from a storage device if a cache miss occurs.

10. The system of claim 9, wherein the storage device reading means further comprises means for reading the data from the SSC associated with the storage device if a SSC cache hit occurs and means for reading the data from the storage device if a SSC cache hit does not occur.

11. The system of claim 10, wherein the storage device reading means further comprises means for updating the HSC with the data requested by at least one computer host and means for updating the cache tag table associated with the HSC to reflect the data requested by at least one computer host.

12. The system of claim 11, the HSC updating means further comprises means for determining the available space in the HSC and means for purging either the least recently used data or the data that have been expired according to the pre-set cache time limit, depending on the data types, from the HSC if sufficient space is not available.

13. The system of claim 1, wherein the write performing means further comprises means for determining a user configurable cache update mode of operation selected from a non-critical coherent mode wherein the data is written to the storage device before the cache is updated and a critical coherent mode wherein the cache is updated and then the data is written to the storage device.

14. The system of claim 13, wherein the write performing means further comprises means for checking a cache tag table to determine if a cache hit occurs, means for updating the data in the cache if a cache hit occurs, means for storing the data in the cache and means for updating the cache tag table.

15. The system of claim 14, wherein the storing data means further comprises means for determining the available space in the cache and means for purging either the least recently used data or the data that have been expired according to the pre-set cache time limit, depending on the data types, from the cache if sufficient space is not available.

16. The cache system of claim 1, wherein the SSC and the HSC each comprise a plurality of cache memory locations and wherein the plurality of cache memory locations comprises semiconductor memory locations and persistent storage device locations.

17. The system of claim 1, wherein the SSC and HSC each further comprise means for storing blocks of data in the cache and means for storing files in the cache.

18. A cache unit capable of caching data requested by a computer host and capable of caching data requested from a storage device, the cache unit comprising:
  a memory for storing cached data that is requested by a computer host;
  a cache manager for servicing the read and write requests from the computer host for data located on a storage device; and
  wherein the cache further comprises a host side cache (HSC) for caching data requested by one or more computer hosts and a storage side cache (SSC) for caching data stored on one or more storage devices and wherein the cache manager further comprises means for performing a read operation on the HSC and means for performing a write operation on the HSC and wherein the write performing means further comprises means for determining a write operation byte limit, means for invalidating the HSC in response to a HSC cache write if the number of bytes in the cache write exceeds the write operation byte limit and means for updating the HSC cache in response to a HSC cache write if the number of bytes in the cache write does not exceed the write operation byte limit.

19. The system of claim 18, wherein the cache unit stores data for one or more computer hosts.

20. The system of claim 18, wherein the cache manager further comprises means for performing a read operation on the SSC and means for performing a write operation on the SSC.

21. The system of claim 20, wherein the SSC read performing means further comprises means for checking a cache tag table stored in the SSC to determine if a cache hit has occurred when data is read from the storage device, means for serving the data from the SSC if a cache hit occurs, means for reading the data from the storage device if a cache miss occurs.

22. The system of claim 21, wherein the storage device reading means further comprises means for updating the SSC with the data read from the storage device and means for updating the cache tag table associated with the SSC to reflect the data read from the storage device.

23. The system of claim 22, wherein the SSC updating means further comprises means for determining the available space in the SSC and means for purging either the least recently used data or the data that have been expired according to the pre-set cache time limit depending on the data types, from the SSC if sufficient space is not available.

24. The system of claim 20, wherein the SSC write performing means further comprises means for determining a user configurable cache update mode of operation selected from a non-critical coherent mode wherein the data is written to the storage device before the cache is updated and a critical coherent mode wherein the cache is updated and then the data is written to the storage device.

25. The system of claim 24, wherein the SSC write performing means further comprises means for checking a cache tag table to determine if a cache hit occurs, means for updating the data in the cache if a cache hit occurs, means for storing the data in the cache and means for updating the cache tag table.

26. The system of claim 25, wherein the storing data means further comprises means for determining the available space in the cache and means for purging either the least recently used data or the data that have been expired according to the pre-set cache time limit, depending on the data types, from the cache if sufficient space is not available.

27. The system of claim 18, wherein the read performing means further comprises means for checking a cache tag table stored in the HSC to determine if a cache hit has occurred when data is requested by at least one computer host, means for serving the data from the HSC if a cache hit occurs, means for reading the data from a storage device if a cache miss occurs.

28. The system of claim 27, wherein the storage device reading means further comprises means for reading the data from the SSC associated with the storage device if a SSC cache hit occurs and means for reading the data from the storage device if a SSC cache hit does not occur.

29. The system of claim 28, wherein the storage device reading means further comprises means for updating the HSC with the data requested by the one or more computer hosts and means for updating the cache tag table associated with the HSC to reflect the data requested by the one or more computer hosts.

30. The system of claim 24, wherein the HSC updating means further comprises means for determining the available space in the HSC and means for purging either the least recently used data or the data that have been expired according to the pre-set cache time limit, depending on the data types, from the HSC if sufficient space is not available.

31. The system of claim 18, wherein the write performing means further comprises means for determining a user configurable cache update mode of operation selected from a non-critical coherent mode wherein the data is written to the storage device before the cache is updated and a critical coherent mode wherein the cache is updated and then the data is written to the storage device.

32. The system of claim 31, wherein the write performing means further comprises means for checking a cache tag table to determine if a cache hit occurs, means for updating the data in the cache if a cache hit occurs, means for storing the data in the cache and means for updating the cache tag table.

33. The system of claim 32, wherein the storing data means further comprises means for determining the available space in the cache and means for purging either the least recently used data or the data that have been expired according to the pre-set cache time limit, depending on the data types, from the cache if sufficient space is not available.

34. The cache system of claim 18, wherein the SSC and the HSC each comprise a plurality of cache memory locations and wherein the plurality of cache memory locations comprises semiconductor memory locations and persistent storage device locations.

35. The system of claim 18, wherein the SSC and HSC each further comprise means for storing blocks of data in the cache and means for storing files in the cache.

36. The cache unit of claim 18, wherein the cache unit further comprises one or more line cards that connect the cache units to other cache unit through one or more different computer networks and a cache card connected to the line cards wherein the cache card further comprises a computer host cache for computer hosts connected to the one or more line cards, a storage device cache for storage devices connected to the one or more line cards and a cache manager for managing the computer host cache and the storage device cache.

37. A cache unit capable of caching data requested by a computer host and capable of caching data requested from a storage device, the cache unit comprising:
a memory for storing cached data that is stored in a storage device;
a cache manager for servicing the read and write requests for data located in the storage device; and
wherein the cache further comprises a host side cache (HSC) for caching data requested by one or more computer hosts and a storage side cache (SSC) for caching data stored on one or more storage devices and wherein the cache manager further comprises means for performing a read operation on the HSC and means for performing a write operation on the HSC and wherein the write performing means further comprises means for determining a write operation byte limit, means for invalidating the HSC in response to a HSC cache write if the number of bytes in the cache write exceeds the write operation byte limit and means for updating the HSC cache in response to a HSC cache write if the number of bytes in the cache write does not exceed the write operation byte limit.

38. The system of claim 37, wherein one or more storage devices are connected to the cache unit so that the cache unit stores cached data for the one or more storage devices.

39. The system of claim 37, wherein the cache manager further comprises means for performing a read operation on the SSC and means for performing a write operation on the SSC.

40. The system of claim 39, wherein the SSC read performing means further comprises means for checking a cache tag table stored in the SSC to determine if a cache hit has occurred when data is read from the storage device, means for serving the data from the SSC if a cache hit occurs, means for reading the data from the storage device if a cache miss occurs.

41. The system of claim 40, wherein the storage device reading means further comprises means for updating the SSC with the data read from the storage device and means for updating the cache tag table associated with the SSC to reflect the data read from the storage device.

42. The system of claim 41, wherein the SSC updating means further comprises means for determining the available space in the SSC and means for purging either the least recently used data or the data that have been expired according to the pre-set cache time limit depending on the data types, from the SSC if sufficient space is not available.

43. The system of claim 39, wherein the SSC write performing means further comprises means for determining a user configurable cache update mode of operation selected from a non-critical coherent mode wherein the data is written to the storage device before the cache is updated and a critical coherent mode wherein the cache is updated and then the data is written to the storage device.

44. The system of claim 43, wherein the SSC write performing means further comprises means for checking a cache tag table to determine if a cache hit occurs, means for updating the data in the cache if a cache hit occurs, means for storing the data in the cache and means for updating the cache tag table.

45. The system of claim 44, wherein the storing data means further comprises means for determining the available space in the cache and means for purging either the least recently used data or the data that have been expired according to the pre-set cache time limit, depending on the data types, from the cache if sufficient space is not available.

46. The system of claim 37, wherein the read performing means further comprises means for checking a cache tag table stored in the HSC to determine if a cache hit has occurred when data is requested by one or more computer hosts, means for serving the data from the HSC if a cache hit occurs, means for reading the data from a storage device if a cache miss occurs.

47. The system of claim 46, wherein the storage device reading means further comprises means for reading the data from the SSC associated with the storage device if a SSC cache hit occurs and means for reading the data from the storage device if a SSC cache hit does not occur.

48. The system of claim 47, wherein the storage device reading means further comprises means for updating the HSC with the data requested by the one or more computer hosts and means for updating the cache tag table associated with the HSC to reflect the data requested by the one or more computer hosts.

49. The system of claim 48, wherein the HSC updating means further comprises means for determining the available space in the HSC and means for purging either the least recently used data or the data that have been expired according to the pre-set cache time limit, depending on the data types, from the HSC if sufficient space is not available.

50. The system of claim 37, wherein the write performing means further comprises means for determining a user configurable cache update mode of operation selected from a non-critical coherent mode wherein the data is written to the storage device before the cache is updated and a critical coherent mode wherein the cache is updated and then the data is written to the storage device.

51. The system of claim 50, wherein the write performing means further comprises means for checking a cache tag table to determine if a cache hit occurs, means for updating the data in the cache if a cache hit occurs, means for storing the data in the cache and means for updating the cache tag table.

52. The system of claim 51, wherein the storing data means further comprises means for determining the available space in the cache and means for purging either the least recently used data or the data that have been expired according to the pre-set cache time limit, depending on the data types, from the cache if sufficient space is not available.

53. The cache system of claim 37, wherein the SSC and the HSC each comprise a plurality of cache memory locations and wherein the plurality of cache memory locations comprises semiconductor memory locations and persistent storage device locations.

54. The system of claim 37, wherein the SSC and HSC each further comprise means for storing blocks of data in the cache and means for storing files in the cache.

55. The cache unit of claim 37, wherein the cache unit further comprises one or more line cards that connect the cache units to other cache unit through one or more different computer networks and a cache card connected to the line cards wherein the cache card further comprises a computer host cache for computer hosts connected to the one or more line cards, a storage device cache for storage devices connected to the one or more line cards and a cache manager for managing the computer host cache and the storage device cache.

* * * * *